US009600343B2

(12) United States Patent
Yuyitung et al.

(10) Patent No.: US 9,600,343 B2
(45) Date of Patent: Mar. 21, 2017

(54) SYSTEM AND METHOD FOR ANALYZING COMPUTING SYSTEM RESOURCES

(75) Inventors: Tom S. Yuyitung, Toronto (CA); Andrew D. Hillier, Toronto (CA); Gerald W. Smith, Stouffville (CA)

(73) Assignee: Cirba IP Inc., Richmond Hill (CA)

( * ) Notice: Subject to any disclaimer, the term of this patent is extended or adjusted under 35 U.S.C. 154(b) by 0 days.

(21) Appl. No.: 13/310,480

(22) Filed: Dec. 2, 2011

(65) Prior Publication Data

US 2012/0144008 A1  Jun. 7, 2012

Related U.S. Application Data

(60) Provisional application No. 61/419,671, filed on Dec. 3, 2010.

(51) Int. Cl.
*G06F 15/173* (2006.01)
*G06F 9/50* (2006.01)

(52) U.S. Cl.
CPC .................. *G06F 9/5066* (2013.01)

(58) Field of Classification Search
CPC ..................................................... G06F 15/173

USPC .................................................. 709/223-226
See application file for complete search history.

(56) References Cited

U.S. PATENT DOCUMENTS

| | | | |
|---|---|---|---|
| 8,103,486 B1 * | 1/2012 | Rolia et al. ....................... 703/2 |
| 2006/0059253 A1 * | 3/2006 | Goodman et al. ............. 709/223 |
| 2011/0270968 A1 * | 11/2011 | Salsburg ............... G06F 9/5072 709/224 |

* cited by examiner

*Primary Examiner* — Vivek Srivastava
*Assistant Examiner* — Sibte Bukhari
(74) *Attorney, Agent, or Firm* — Brett J. Slaney; Blake, Cassels & Graydon LLP (57) ABSTRACT

It has been recognized that to accurately measure the required resource capacity of computing systems such as servers, various relevant factors should be considered, since the capacity may be excess or insufficient. This measurement can be reflected by the ratio of the theoretical minimum server capacity required relative to the actual server capacity provisioned, hereinafter also referred to as the "fully loaded utilization", which can be expressed in various ways, including as a percentage or an efficiency index or other number or value.

21 Claims, 7 Drawing Sheets

SYSTEM AND METHOD FOR ANALYZING COMPUTING SYSTEM RESOURCES

This application claims priority from U.S. Provisional Application No. 61/419,671 filed on Dec. 3, 2010, the contents of which are incorporated herein by reference.

TECHNICAL FIELD

The following relates generally to computing systems and more particularly to systems and methods for analyzing computing system resources.

BACKGROUND

Modern data centers typically comprise hundreds if not thousands of servers. Each server supplies a finite amount of resource capacity, typically in the form of, but not limited to: central processing unit (CPU) capacity, memory or storage capacity, disk input/output (I/O) throughput, and network I/O bandwidth. Workloads running on these servers consume varying amounts of these resources. With the advent of virtualization and cloud technologies, individual servers are able to host multiple workloads.

Percent CPU utilization, which corresponds to the ratio of CPU usage relative to CPU capacity, is a common measure of how effectively servers are being utilized. CPU utilization tends to vary over time and is often reported using average values over a given time interval (e.g. minute, hourly, daily, etc.).

The overall CPU utilization of a group of servers or an entire data center can be computed by aggregating the normalized utilization levels of the servers. CPU benchmarks can be used to normalize the percent CPU utilization of the servers to reflect the relative processing capabilities of each server.

Similar utilization metrics can be computed for other resources such as memory, storage, disk throughput and network bandwidth.

In many data centers, workloads do not fully utilize resources of many of the servers, for example, the average CPU utilization levels of servers can range from 10 to 20%. Other server resources such as memory, disk I/O and network I/O tend to also be underutilized.

Organizations often seek to reduce capital and operating costs of data centers by eliminating excess server capacity. A common strategy is to consolidate workloads onto a smaller number of servers. In most virtualized environments, workloads can be migrated between servers, easing the implementation of the consolidation strategy. However, the actual amount of consolidation that can be safely achieved is often not readily determinable. For instance, an IT environment where the workloads utilize an average of 20% of the server CPU capacity does not necessarily mean that 80% of the servers can be eliminated.

There are many factors that can affect why servers tend not to be fully utilized. Such factors may include, without limitation:

Peak demands—The resource demands of most workloads are not constant and have peak demands that need to be serviced.

Unbalanced supply and demand of resources—In many cases, one of the resources (e.g. memory) is the primary constraint, resulting in unused capacity of the other resources.

Capacity fragmentation—Resource capacity may be stranded on servers due to the indivisibility of some workloads and discrete supply of capacity from distinct servers.

Expected growth—Resource capacity may be reserved for anticipated growth in workloads.

Business policies—Some workloads may need to be run together with or apart from other workloads due to data sensitivity, service level agreement (SLA) requirements, etc.

Server redundancy—Resource capacity is often reserved for critical workloads to handle server failures.

Thus, traditional metrics such as percent CPU utilization often do not accurately reflect what portion of the server capacity can be eliminated.

It is an object of the following to address the above-noted disadvantages.

SUMMARY

In one aspect, there is provided a method of analyzing computing system resources, the method comprising: obtaining a first set of data pertaining to characteristics of each of a plurality of computing systems; obtaining a second set of data pertaining to characteristics of one or more workloads hosted on the plurality of computing systems; generating a first data model using the first set of data, the first data model comprising resource capacities and capabilities of the computing systems; generating a second data model using the second set of data, the second data model comprising requirements associated with the workloads; performing a workload placement analysis by placing the one or more workloads onto the plurality of computing systems, using the first and second data models, to determine a theoretical minimum computing system capacity required to fulfill the one or more workloads; and computing a value based on a ratio of the theoretical minimum computing system capacity relative to a total capacity of the plurality of computing systems.

In another aspect, there is provided a computer readable medium comprising computer executable instructions for analyzing computing system resources, the computer executable instructions comprising instructions for: obtaining a first set of data pertaining to characteristics of each of a plurality of computing systems; obtaining a second set of data pertaining to characteristics of one or more workloads hosted on the plurality of computing systems; generating a first data model using the first set of data, the first data model comprising resource capacities and capabilities of the computing systems; generating a second data model using the second set of data, the second data model comprising requirements associated with the workloads; performing a workload placement analysis by placing the one or more workloads onto the plurality of computing systems, using the first and second data models, to determine a theoretical minimum computing system capacity required to fulfill the one or more workloads; and computing a value based on a ratio of the theoretical minimum computing system capacity relative to a total capacity of the plurality of computing systems.

In yet another aspect, there is provided an analysis system comprising a processor and memory, the memory storing computer executable instructions for analyzing computing system resources, the computer executable instructions comprising instructions for: obtaining a first set of data pertaining to characteristics of each of a plurality of computing systems; obtaining a second set of data pertaining to characteristics of one or more workloads hosted on the plurality of computing systems; generating a first data model using the first set of data, the first data model comprising resource capacities and capabilities of the computing systems; generating a second data model using the second set of data, the second data model comprising requirements associated with the workloads; performing a workload placement analysis by placing the one or more workloads onto the plurality of computing systems, using the first and second data models, to determine a theoretical minimum computing system capacity required to fulfill the one or more workloads; and computing a value based on a ratio of the theoretical minimum computing system capacity relative to a total capacity of the plurality of computing systems.

BRIEF DESCRIPTION OF THE DRAWINGS

Embodiments will now be described by way of example only with reference to the appended drawings wherein.

DETAILED DESCRIPTION OF THE DRAWINGS

It has been recognized that to accurately measure the required resource capacity of computing systems such as servers, various relevant factors should be considered, since the capacity may be excess or insufficient. As will be described herein, this measurement can be reflected by the ratio of the theoretical minimum server capacity required relative to the actual server capacity provisioned, hereinafter also referred to as the "fully loaded utilization". It can be appreciated that the fully loaded utilization can be expressed in various ways, as exemplified below, including as a percentage or an efficiency index or other number or value.

By having this ratio, it can be determined that if the fully loaded utilization is less than 100% (or less than a particular index), there is excess server capacity relative to the workload requirements, based on the defined policies, assumptions and other parameters and constraints. If the fully loaded utilization is 100% (or at a maximum index value), the server capacity matches the workload requirements based on the defined policies, etc. If the fully loaded utilization is greater than 100% (or greater than the maximum index value), there is insufficient server capacity relative to the workload requirements, based on the defined policies, assumptions, and other parameters and constraints.

It has been found that the fully loaded utilization metric can be used for, among other things: setting and measuring progress towards efficiency targets; computing resource requirements of a set of workloads for measuring costs and chargeback; comparing what-if scenarios (e.g. consolidate clusters, consolidate data centers, modify growth projections, change workload security requirements, etc.); and comparing group of servers (e.g. clusters, data centers, etc.); by accurately measuring the excess server capacity for a collection of workloads and servers.

Figure 1:
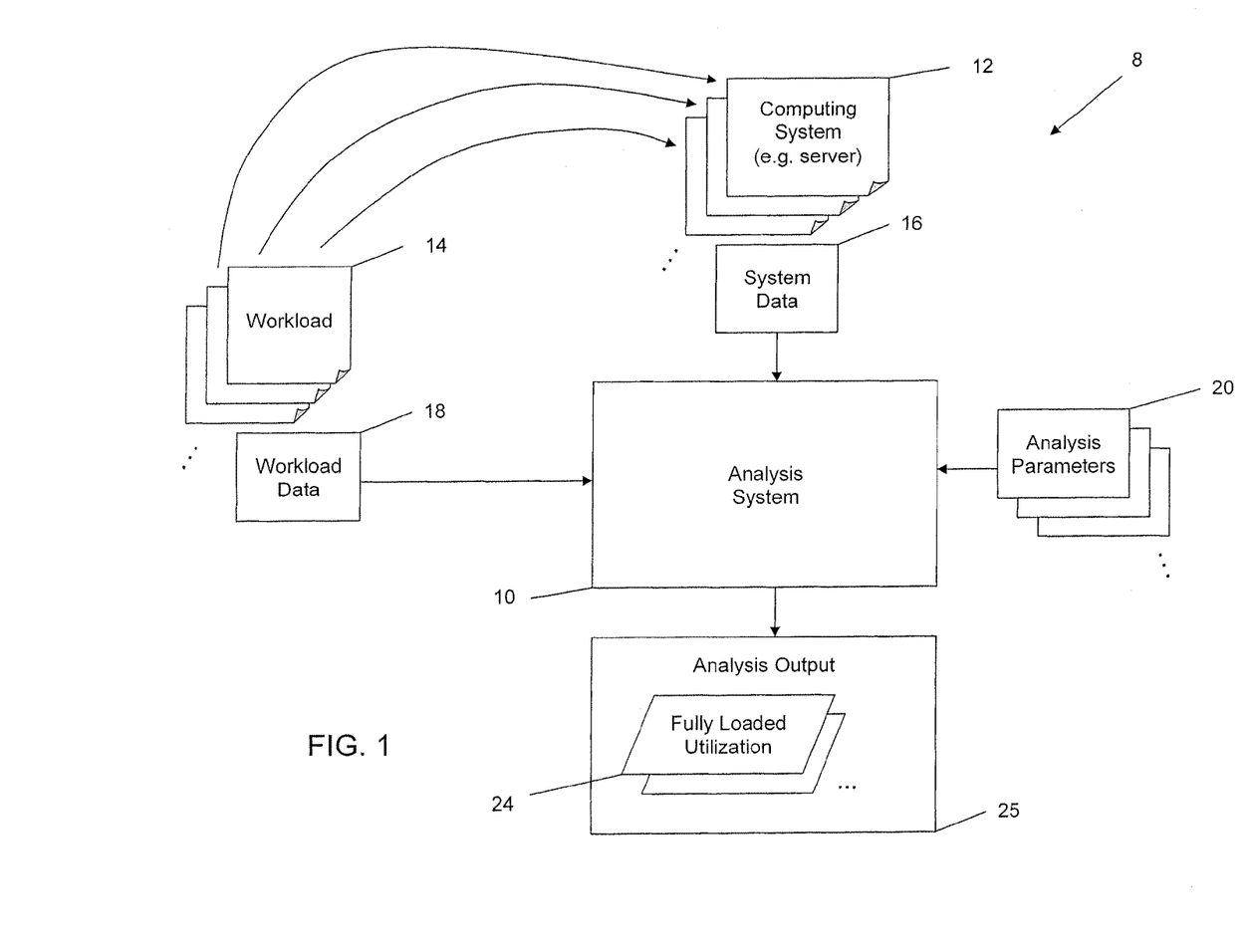
FIG. 1 is a block diagram of an analysis system configured to obtain workload data and system data associated with a computing environment comprising a plurality of computing systems.

Turning now to the figures, FIG. 1 illustrates an example computing environment 8 to be analyzed by an analysis system 10. The computing environment 8 in this example comprises a plurality of computing systems 12, e.g. servers. The computing systems 12 are operable to perform one or more computing tasks or operations and may or may not work cooperatively, e.g. in a cluster. In some embodiments, the computing environment 8 is related to a single organization, however, the computing environment 8 may also serve several organizations or entities, e.g. a computing cloud, "server farm", etc. The computing systems 12 serve, facilitate, fulfill or otherwise provide resources for one or more workloads 14. Each workload 14 may generally refer to one or more tasks or operations expected to be conducted by one or more of the computing systems 12.

Figure 3:
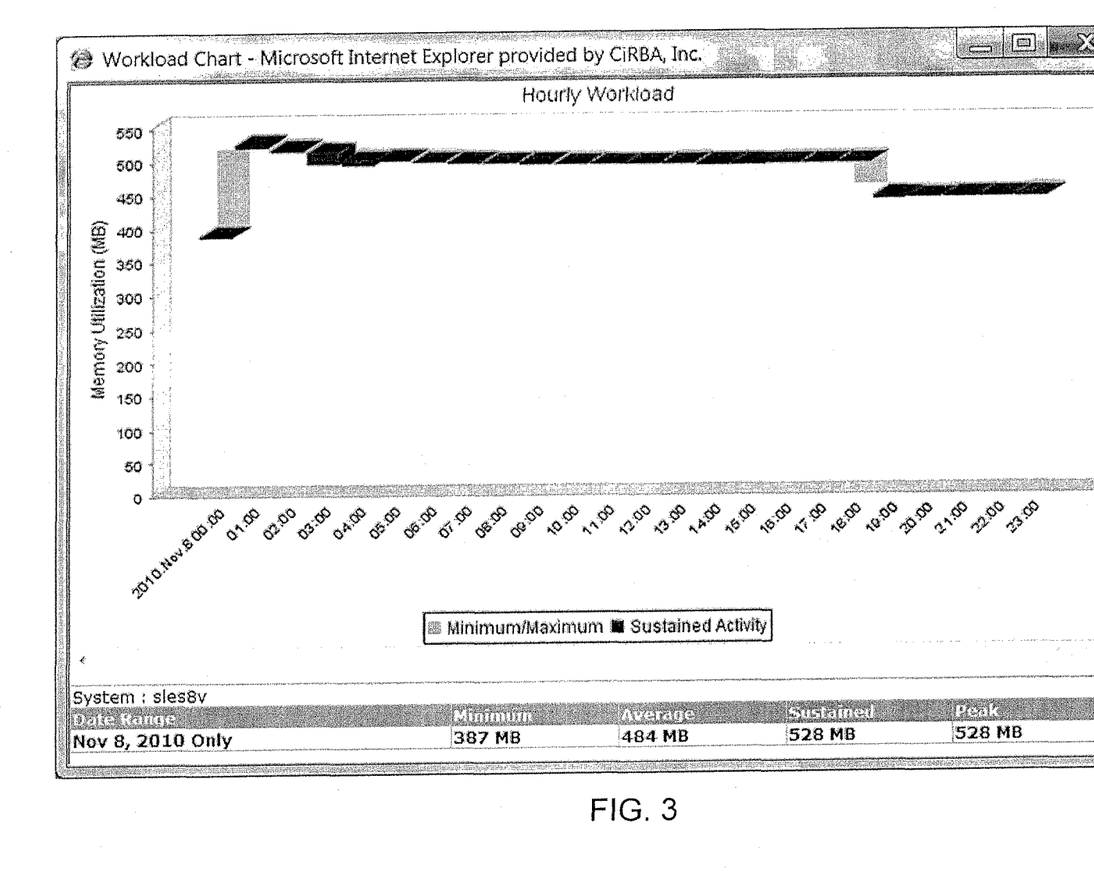
FIG. 3 is a screen shot illustrating set of workload data providing a memory utilization workload chart in hourly quartiles.
Figure 4:
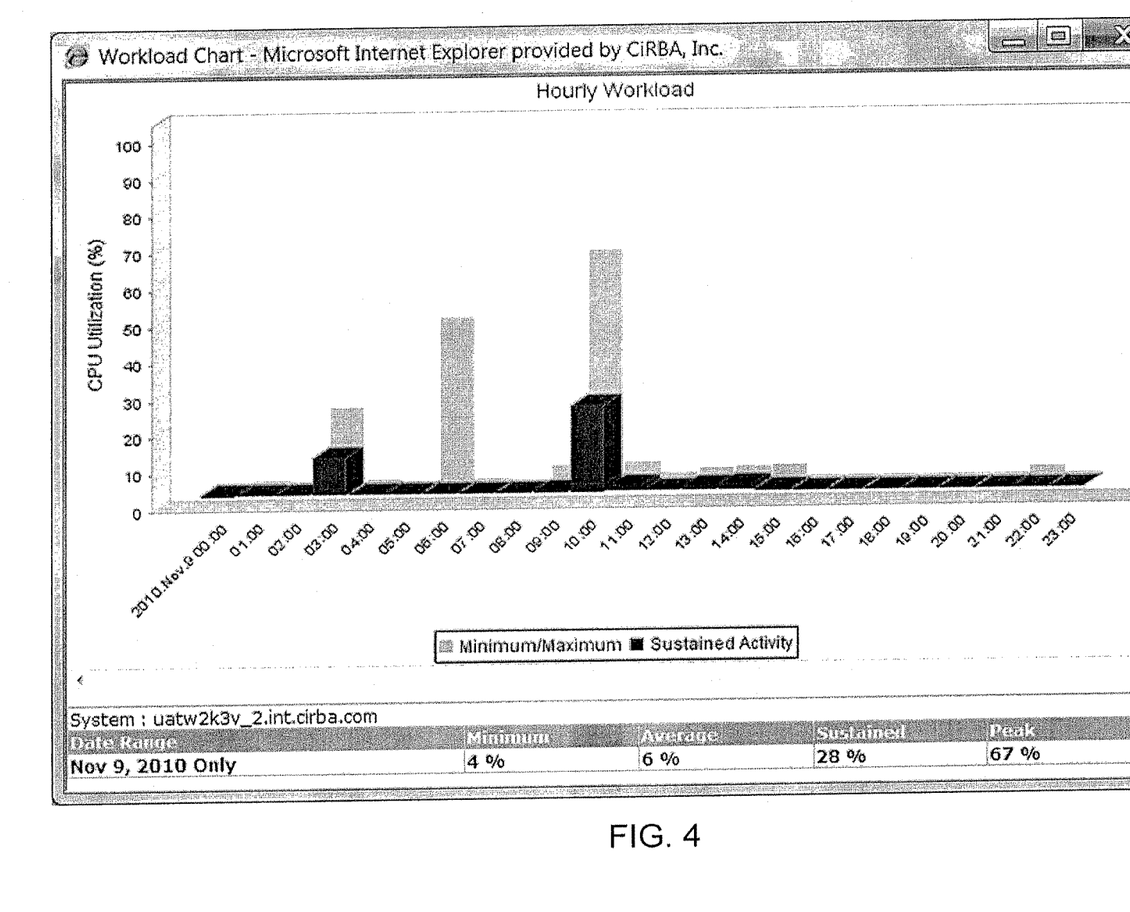
FIG. 4 is a screen shot illustrating a set of workload data providing a percent CPU utilization workload chart in hourly quartiles.

Each computing system 12 in this example has associated therewith, a set of system data 16. The system data 16 may describe, for example, the system's capabilities and resource capacities as they relate to the analyses discussed in greater detail below. Each workload 14, or the workloads 14 collectively, has/have associated therewith, workload data 18. The workload data 18 may describe, for example, resource utilization, performance and availability requirements, and compatibilities as they relate to modeling constraints associated with placing the workloads 18 on the computing systems 12 as will be described in greater detail below. One example set of workload data 18 providing a memory utilization workload chart in hourly quartiles encompassing 24 hours is shown in FIG. 3. Another example set of workload data 18 providing a percent CPU utilization workload chart in hourly quartiles encompassing 24 hours is shown in FIG. 4. Other embodiments of the resource utilization levels of workloads are possible and can include, without limitation, time-series data at 1 minute intervals, hourly averages, daily quintiles, etc.

The analysis system 10 is configured or otherwise operable to obtain the system data 16 and workload data 18, e.g. by downloading such data, having such data uploaded thereto, or otherwise effecting a transfer or access to the data over an available interface such as a network connection, disk drive, etc. The analysis system 10 also typically considers analysis parameters 20 in order to perform an efficiency analysis on the system and workload data 16, 18. The analysis parameters 20 may include, for example, assumptions, constraints, and optimization criteria governing how workloads 14 are to be placed. The analysis assumptions and constraints may also consider business policies in performing an efficiency analysis. The business policies may include, for example, workloads 14 that may need to run together with or apart from other workloads 14 due to data sensitivity, SLA requirements, etc. as noted above.

The analysis system 10 thus obtains or is otherwise provided with system data 16, workload data 18 and, if applicable analysis parameters 20, in order to compute an analysis output 25 which uses one or more fully loaded utilization 24 computations in one or more scenarios and/or uses of the metric. As will be explained in greater detail below:

fully loaded utilization=theoretical minimum server capacity/actual server capacity provisioned*100

This value reflects the actual amount of computing system capacity that is required for all of the workloads 14. If the fully loaded utilization is less than 100, this value subtracted from 100 thus reflects the amount of computing system capacity that can be eliminated while still being able to run the workloads 14 safely, i.e. within the parameters of the analysis.

The fully loaded utilization 24 can be advantageously used for estimating how much capacity can be eliminated from the computing environment 8, and thus how much cost can be reduced. The fully loaded utilization 24 can also be advantageously used for comparing different environments and for setting targets for increasing efficiency over time.

It can be appreciated that an efficiency index may also be used to express a value rather than a percentage. In such cases, the index may be computed as:

$$\text{index} = \text{ROUND}((\text{fully loaded utilization}/100), X),$$
wherein ROUND rounds the result to $X$ decimal places, e.g., 2.

Figure 2:
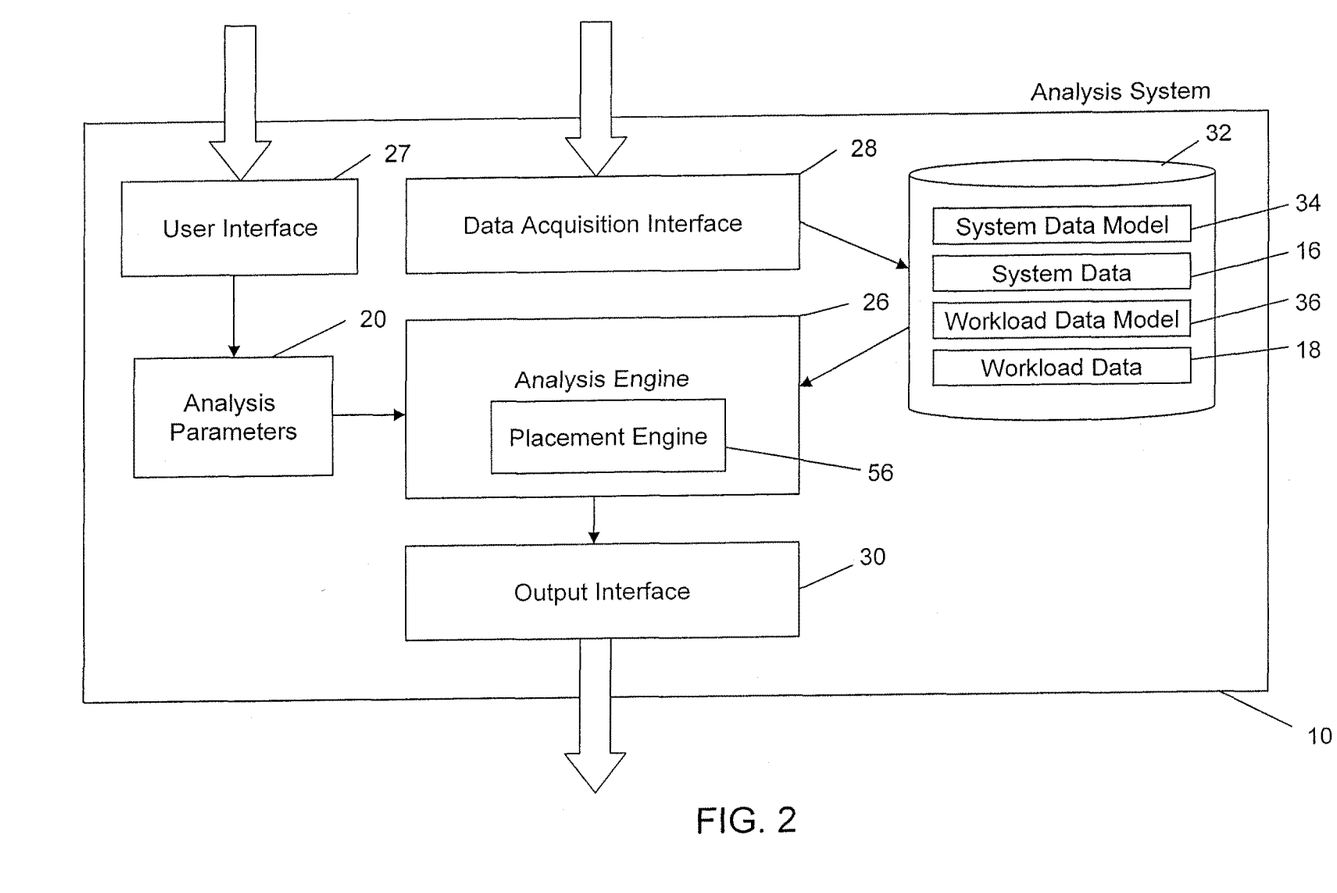
FIG. 2 is a block diagram showing an example configuration for the analysis system of FIG. 1.

FIG. 2 illustrates an example configuration for the analysis system 10. It will be appreciated that the example shown in FIG. 2 is for illustrative purposes only and the analysis system 10 may therefore be configured in various other ways in order to operate according to the principles herein discussed. In this example configuration, the analysis system 10 comprises a data acquisition interface 28 that that obtains the system data 16 and workload data 18. The data acquisition interface 28 may comprise, for example, a data connection/network connection (wired or wireless), data bus, disk drive, etc., i.e. any suitable interface 28 capable of enabling the analysis system 10 to obtain electronic data. The analysis system 10 also comprises a user interface 27 to allow users to specify one or more sets of analysis parameters 20.

The analysis system 10 comprises an analysis engine 26 which, in this example, is used to perform analyses in order to generate the fully loaded utilization 24, which can be provided as an output via an output interface 30. The analysis engine 26 may be used to incorporate one or more fully loaded utilizations 24 computations based for multiple scenarios defined through the various sets of analysis parameters 20 into an output such as a series of charts or other graphical outputs showing particular scenarios or comparing outcomes. The output interface 30 may also comprise a data/network connection (wired or wireless), data bus, disk drive, etc. as well as a user interface such as a display. As such, it can be appreciated that the output interface 30 may be the same as the data acquisition interface 28 or otherwise share components and/or capabilities in order to provide a suitable output type. The data acquisition interface 28 and output interface 30 are therefore shown separately in FIG. 2 for illustrative purposes only.

The electronic data that is obtained by the analysis engine 26 via the data acquisition interface 28 in this example, is provided to a data storage 32. The data storage 32 may be a component of the analysis system 10 or otherwise accessible thereto as shown in FIG. 2. The data storage 32 may store the electronic data in its native format or in the format it is provided to or obtained by the data acquisition interface 28. The data storage 32 may also store the electronic data in any other suitable or desired format. For ease of illustration, the various exemplary types of electronic data are shown separately and with distinct reference numerals in FIG. 2. These include, system data 16, workload data 18, and analysis parameters 20. As will be explained below, the system data 16 is used to generate a system data model 34, which is also stored in the data storage 32 in this example. The workload data 18 is similarly used to generate a workload data model 36, which is also stored in the data storage 32 in this example. The system data model 34 and workload data model 36 pertain to particular sets of system data 16 and workload data 18 respectively. Therefore, if multiple sets of workload data 18 and/or system data 16 are stored in the data storage 32, the data storage 32 may be organized to group such sets of data 16, 18 and their respective data models 34, 36 in order to perform multiple independent analyzes. The analysis engine 26 comprises a placement engine 56 for performing placement analyses, further detail for which will be provided below. It will be appreciated that the placement engine 56 may also be distinct from the analysis engine 26 and is only shown as part thereof for illustrative purposes.

As noted above, the fully loaded utilization 24 corresponds to the ratio of the theoretical minimum computing system capacity required for the workloads, relative to the actual computing system capacity provisioned.

To compute the fully loaded utilization 24, the ratios of the computing system capacities can be expressed using any one of the computing system resources (e.g. CPU, memory, disk I/O, network I/O, power consumption, number of virtual processors, etc.). The CPU resource is often used when computing this ratio since computing system capacities, in particular with servers, are generally equated with their processing capabilities.

For example, the fully loaded utilization 24 expressed as a ratio of CPU capacities can be computed as follows:

$$\text{Fully Loaded Utilization}_{CPU} = \text{Theoretical Minimum System Capacity}_{CPU} / \text{Actual System Capacity Provisioned}_{CPU} * 100\%$$

In the above equation, CPU capacities can be expressed using a common benchmark unit such as CINT2006 Rate from the Standard Performance Evaluation Corporation (SPEC) or Relative Performance Estimates (RPE2) from Ideas International (IDEAS).

In another example, the fully loaded utilization 24, expressed as a ratio of memory capacities, can be computed as follows:

$$\text{Fully Loaded Utilization}_{Mem} = \text{Theoretical Minimum System Capacity}_{Mem} / \text{Actual System Capacity Provisioned}_{Mem} * 100\%$$

In the above equation, the memory capacities can be expressed in a common unit such as Kilobytes (KB).

The theoretical minimum system capacity required by the workloads 14 is determined by placing the workloads 14 onto the minimum system capacity, subject to the applicable constraints, assumptions and optimization criteria.

The optimization criterion for placing the workloads 14 on the computing systems 12, can be based on minimizing the total computing system capacity of one or more of the resources, such as CPU, memory, I/O bandwidth, power consumption, etc. For example, a common criterion is to minimize the processor capacity of the computing systems 12 required to host the workloads 14.

The criteria for placing the workloads 14 can also be based on minimizing the capacity of multiple computing system resources. For example, possible criteria are to minimize both the processor and memory capacity of the computing systems 12. Numerical weights can be used to indicate the relative importance of the optimization criteria.

As discussed above, the fully loaded utilization analysis requires the system data 16 and workload data 18, which describe the computing systems 12 and workloads 14 to be analyzed respectively. The data required for the computing systems 12 may include the system resource capacities and system capabilities. For each computing system 12, the resource capacities can include the following: number of processors, total processor speed in MHz, total processor benchmarks, total amount of memory, disk I/O throughput, network I/O throughput, total power consumption, number of virtual processors, etc.

The computing system capabilities can include such things as: host operating system, version and patch level, host compatibility with workload operating systems, supported service availability level, to name a few.

The workload data 18 required for analyzing the one or more workloads 14 may include workload utilization and workload requirements. For each workload 14, historical and/or projected resource utilization levels are typically used. This particular portion of the workload data 18 may be represented using time-series data, hourly quartiles, hourly averages, etc. (e.g. see FIGS. 3 and 4 discussed above).

Examples of resource utilization data can include: CPU utilization in percent or MHz, memory utilization (MB), disk I/O activity (e.g. bytes/sec), network I/O activity (e.g. bytes/sec), etc. For each workload 14, the following requirements and characteristics may also be defined:

Resource allocations, reservations, shares—e.g. number of virtual processors, processor resource reservations in MHz, processor shares based on relative weights, memory reservations in MB.

Performance and availability requirements—e.g. service level agreements, priorities, etc.

Compatibility with computing systems 12—whether workload 14 is supported to run on the particular computing systems 12.

Compatibility with other workloads 14—whether workloads 14 can be placed on the same computing system 12—e.g. workloads 14 with different security requirements should typically not run on the same computing system 12 (in particular where the computing system 12 is a server).

Figure 5:
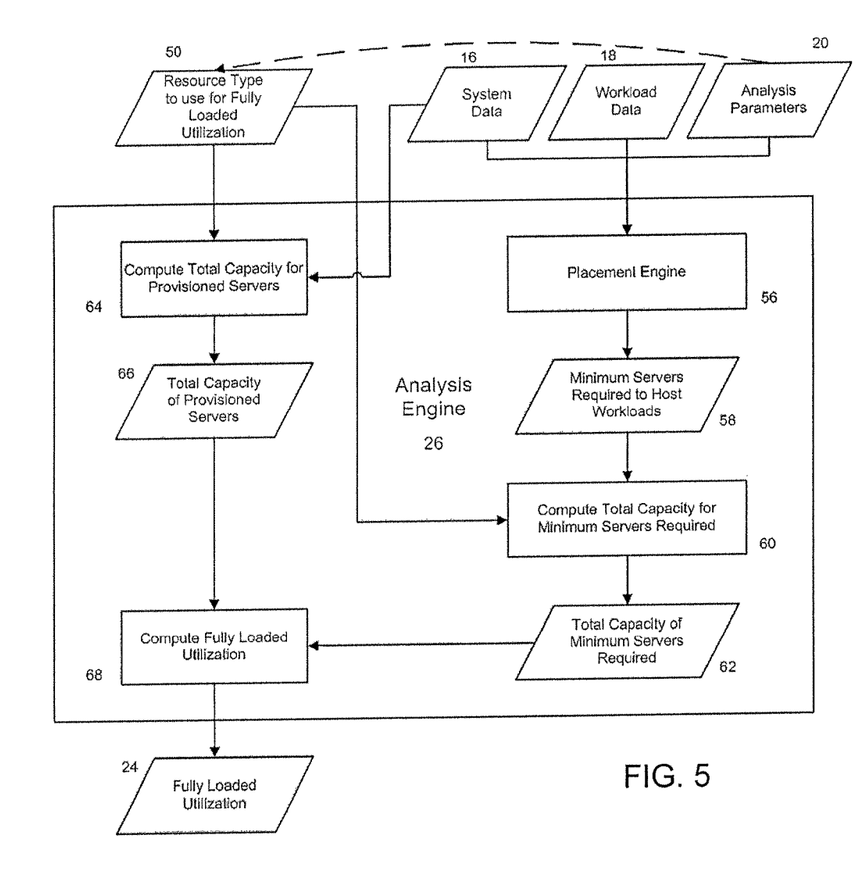
FIG. 5 is a flow chart illustrating an example set of computer executable operations for computing a fully loaded utilization metric.

FIG. 5 illustrates an example set of computer executable operations for computing the fully loaded utilization 24 using the analysis engine 26. At 50, the resource type (e.g. CPU) that is to be used for the fully loaded utilization analysis is identified, typically from the analysis parameters 20 as shown using the dashed line in FIG. 5. The scope of the computing systems 12 and workloads 14 (e.g. servers) to be included in the analysis is also determined by obtaining the system data 16 and workload data 18. The assumptions, constraints, and optimization criteria (i.e. analysis parameters 20), if applicable, are also defined, determined, or otherwise obtained. The assumptions, constraints, and optimization criteria govern how the workloads 14 are to be placed onto the computing systems 12 as discussed above.

Figure 6:
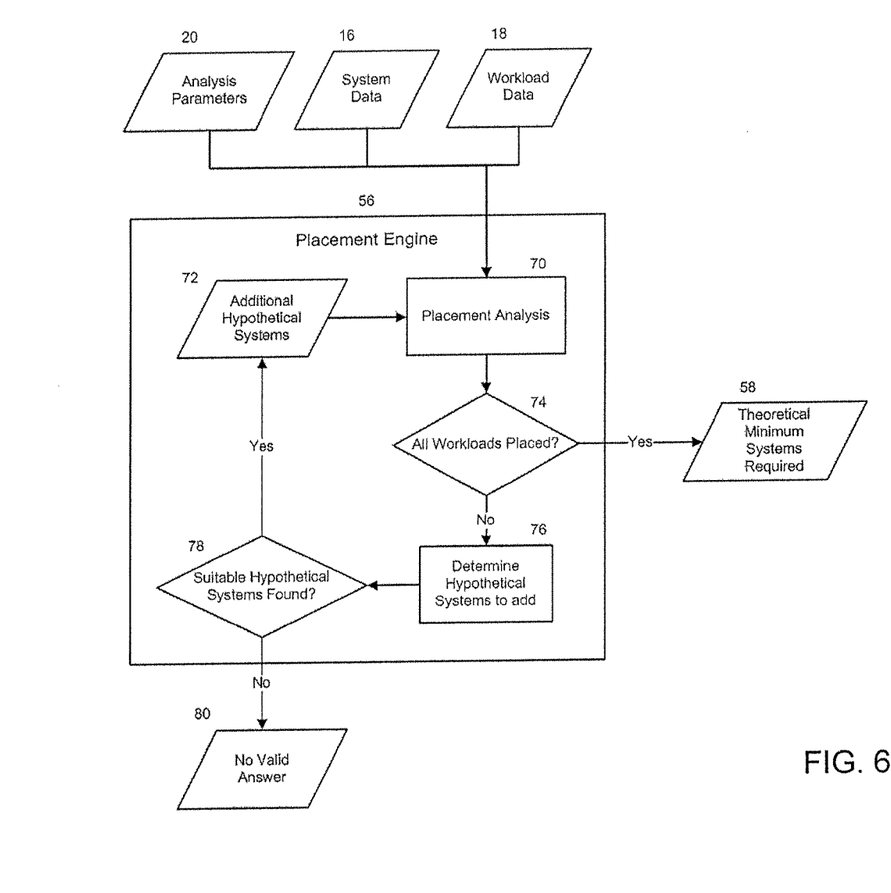
FIG. 6 is a flow chart illustrating an example set of computer executable operations for performing a placement analysis.

A placement analysis 70 is then performed using a placement engine 56 according to the system scope determined using the system data 16 and workload data 18, and the analysis parameters 20. Further detail of an example placement analysis 70 using the placement engine 56 is shown in FIG. 6. The placement analysis 70 is performed in order to determine the theoretical minimum system capacity required 58 to accommodate the workloads 14 in the analysis (see both FIGS. 5 and 6).

Using the minimum computing systems 12 required to host the workloads 14 at 58, and according to the resource type specified at 50, the total capacity for the minimum computing systems 12 required can be computed at 60, which provides the total capacity of the minimum computing systems 12 that are required at 62.

Meanwhile, the total capacity for the provisioned computing systems 12 is computed at 64 according to the resource type determined at 50. The total capacity of the provisioned computing system 12, provided at 66, along with the total capacity of the minimum computing systems 12 required determined at 62, are then used at 68 to compute the fully loaded utilization 24. As discussed above, the fully loaded utilization 24 corresponds to the ratio of the theoretical minimum computing system capacity 62 relative to the total computing system capacity 62.

As shown in FIG. 6, the placement analysis 70 determines the theoretical minimum system capacity required by the workloads 14 in accordance with the analysis parameters 20, e.g. the analysis assumptions, constraints and optimization criteria. The placement analysis 70 in one embodiment, seeks to optimize the total system capacity required for the workloads 14 through a trial-and-error algorithm that evaluates various combinations workload placements onto the provisioned computing systems 12. Example algorithms for evaluating various combinations may be found in co-owned U.S. patent application Ser. No. 11/738,936 filed Apr. 23, 2007 and entitled: "Method and System for Determining Compatibility of Computer Systems", the entire contents of which are incorporated herein by reference. These placements are subject to the analysis assumptions and constraints.

In cases where at 74 it is determined that the existing workloads 14 cannot be placed on the provisioned systems 12 due to the analysis constraints and assumptions, additional systems 12 can be introduced to host the unplaced workloads 14. The additional systems 12 can be based on the existing system configurations or other hypothetical system configurations as defined through the analysis parameters 20. As such, if not all workloads 14 can be placed at 74, the placement engine 56 can determine the hypothetical systems to add at 76. If it is determined at 78 that suitable hypothetical systems can be found, the additional hypothetical systems at 72 are provided to the placement analysis 70 to perform an additional analysis. Depending on the analysis parameters, the placement analysis may incrementally place the unplaced workloads on the additional systems, or redo the placement analysis for all workloads onto all the systems in scope.

In addition to the hypothetical system configurations, analysis parameters 20 can specify the maximum quantity and/or order of precedence when selecting the systems 20 to be added to the analysis scope. This models the notion that some systems 12 may be preferred over others due to availability, costs, etc. Like existing systems 12, the placements of workloads 12 on these additional systems 12 are subject to the analysis assumptions, constraints and optimization criteria.

In the event that one or more workloads 14 cannot be placed, even with the additional systems 12 determined at 76, the fully loaded utilization value 24 is considered undefined, indicating that a suitable hypothetical system cannot be found at 78 and an output indicating that no valid answer has been found provided at 80.

It can be appreciated that alternative approaches to the condition wherein one or more source workloads are unplaced may exist. For example, consider a scenario wherein there are 100 sources and 10 targets, and the analysis finds that 98 sources can be placed on 6 targets with 2 unplaced sources. To compute the fully loaded utilization, the system can be configured to assume that the 2 unplaced sources each require 1 target. As such, it can be assumed that 8 (6+2) targets are required to run the 100 source workloads.

The fully loaded utilization can then be computed as $8/10*100\%=80\%$. The corresponding index value, if used, would therefore be 0.80.

Example analysis assumptions include: model high priority workloads 14 based on their peak utilization levels, model medium priority workloads 14 based on their sustained ($3^{rd}$ quartile) utilization levels, having to include an annualized growth of 10% for the utilization levels of all workloads 14, having to include system capacity to handle N-system failures, the order of precedence for selecting systems 12 when placing workloads 14.

In the event that the existing workloads 14 do not fit on the provisioned systems 12, analysis assumptions define how additional system capacity can be added to the analysis. The assumptions include the hypothetical system configurations to be used for additional system capacity and the maximum quantity of each type of system 12 that may be added. The hypothetical system configurations may be based on provisioned systems 12 as well as systems 12 not found in the provisioned environment 8.

Example analysis constraints include: the total of the hourly sustained CPU utilization of the workloads 14 placed on the system 12 being required to not exceed 70% of system processor capacity, the total peak memory utilization of the workloads placed on the system 12 being required to not exceed 90% of the system memory capacity, the total number of virtual processors of the workloads 14 placed on the system 12 relative to the total physical processor cores of the system 12 being required to not exceed a ratio of 10 to 1, the total memory reservations of the workloads 14 being required to not exceed 90% of the total memory installed on the computing system 12, ensuring that workloads 14 belonging to different security zones are not placed on the same computing system 12, etc.

The fully loaded utilization metric 24 may be used in various ways as noted above. Several example uses of the fully loaded utilization 24 will now be described. It can be appreciated that various other uses can apply.

One example use comprises comparing the fully loaded utilization 24 for multiple "what if" scenarios for the same set of servers and workloads. In this example, assuming peak loads, one may include a high availability capacity for failure of 10% of computing systems 12, and a 5% growth in workloads 14 associated with a specific application. The "what if" may be that on top of these above assumptions and constraints, a constraint may wish to be added which specifies not mixing workloads with different security zones on the same computing system 12. If this occurs, the analysis aims to determine: What is the incremental change to the fully loaded utilization 24?

It may be noted that one can also perform what if analyses where a constraint or assumption is removed—e.g. do not assume 5% growth in workloads.

Another example use comprises comparing the fully loaded utilization 24 for multiple time periods (e.g. daily) for the same computing environment 8 (e.g. data center, cluster). In this example, the assumptions and constraints are held constant, but the utilization levels of the workloads 14, the actual number of workloads 14 running and computing systems 12 being provisioned can change over time. The results can be visualized using an x-y chart as shown in FIG. 6, wherein the y-axis is the fully loaded utilization 24, and the x-axis is a time scale.

Yet another example use comprises combining multiple what if scenarios with the multiple time periods. In this example, the fully loaded utilization 24 is computed for the multiple what if scenarios over multiple time periods. The results can be visualized using stacked x-y charts (e.g. as illustrated in FIG. 6), wherein the y-axis is the fully loaded utilization 24 for multiple scenarios, and the x-axis is a time scale.

Yet another example use comprises adding hypothetical workloads to evaluate a what if scenario for new workloads to be introduced into the computing environment 8. In this example, new workloads 14 can be added to the analysis scope to determine the actual amount of computing system capacity required to host the workloads 14.

An example scenario will now be described, wherein the computing environment 8 comprises identical computing systems 12, e.g. identical servers 12'.

Consider an environment comprised of 1000 workloads running on 100 servers with identical resource capacities. Assume that there is one week (7 days) of workload utilization data 18 available. As such, the fully loaded utilization 24 can be computed for the computing environment 8 for each day of the week.

In addition, it may be assumed that the fully loaded utilization 24 is to be computed for two scenarios. In the first scenario, the theoretical minimum server capacity required may be determined based on the daily peak utilization levels of the workloads 14. In the second scenario, the theoretical minimum server capacity required may be determined based on the daily peak utilization levels of the workloads 14 while also applying the business policies. The specific business policies in this example are that the workloads 14 with different security zone designations are to run on separate servers 12' and that there is needed sufficient capacity to handle the failure of 2% of the servers 12'. Thus, the fully loaded utilization 24 can be computed for each day of the week and for each scenario, generating fourteen (14) fully loaded utilization results.

Figure 7:
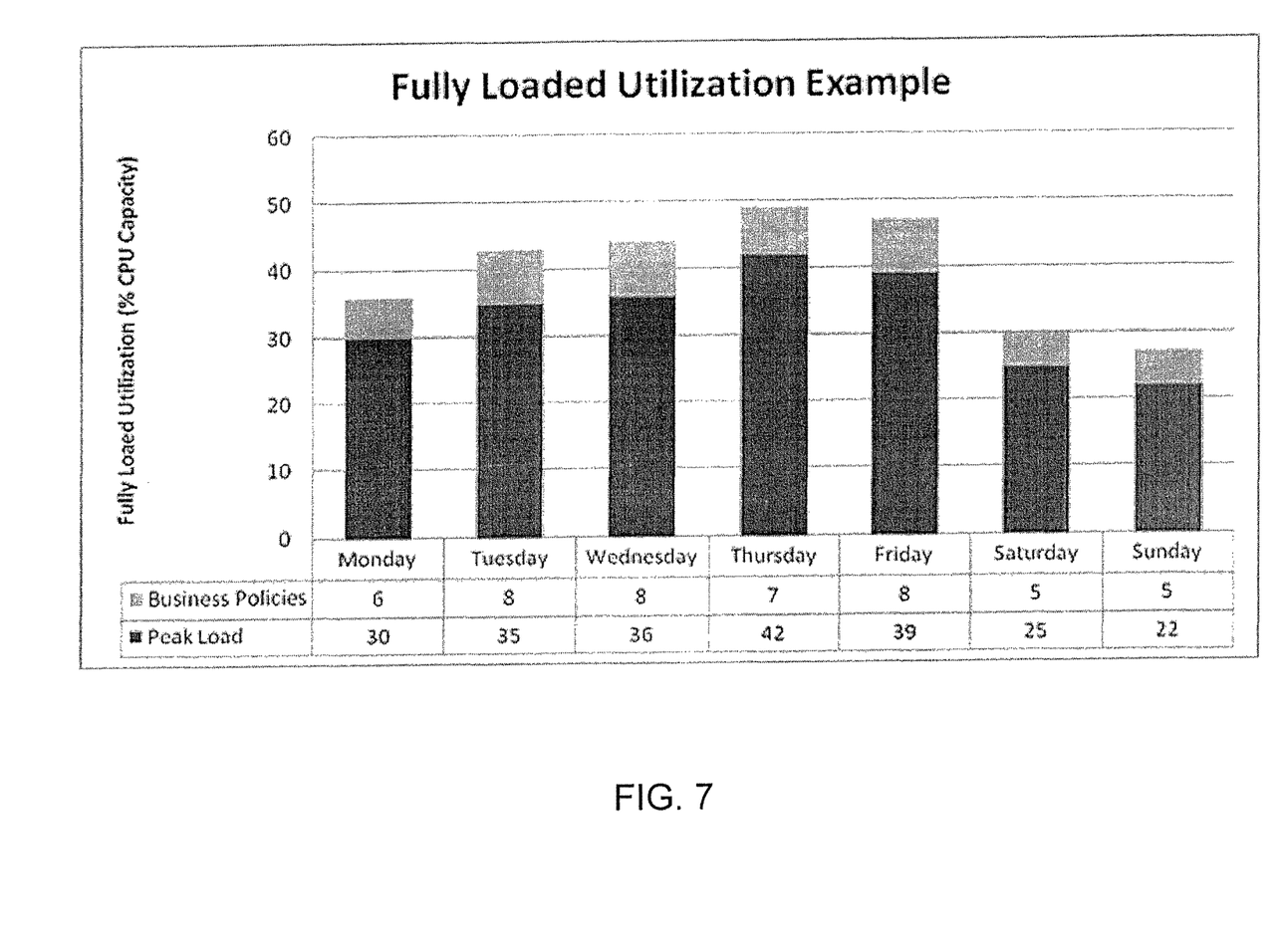
FIG. 7 is an example chart showing fully loaded utilization versus time.

For example, assume that based on the peak utilization levels of the workloads 14 on Monday, the theoretical minimum servers required is thirty (30). And since the servers have identical resource capacities and there are 100 servers provisioned, the fully loaded utilization is $30/100*100\%=30\%$. Next, assume that based on the peak utilization levels of the workloads 14 on Monday and the business policies defined previously, the theoretical minimum number of servers 12' is computed to be thirty six (36). The fully loaded utilization 24 for this scenario is 36%. These computations can then be performed for the remaining days of the week (Tuesday to Sunday). The results are summarized in FIG. 7.

It may be noted that because the servers 12' are identical with respect to server resource capacities (i.e. same CPU benchmarks, memory, etc.), the fully loaded utilization metrics based on CPU capacity, memory, etc. are the same.

The fully loaded utilization analysis 24 can also be applied to environments 8 comprising computing systems 12 (e.g. servers 12' in the following example), with different resource capacities.

For these cases, the placement analysis considers these differences between the servers 12' when placing the workloads 14 on the servers 12'. Furthermore, the optimization criteria which defined the resource type (e.g. CPU and/or memory) whose server capacity is to be optimized will affect the desired placements.

For example, consider an environment where the servers 12' have different CPU and memory capacities. Two servers 12' have CPU benchmarks and memory capacities of 5000 RPE2 and 32 GB of memory, respectively. Two other servers 12' have CPU benchmarks and memory capacities of 7000 RPE2 and 16 GB of memory.

Assuming the workloads 14 will fit on any combination having two (2) of the servers 12', the desired placements will vary depending upon the optimization criteria.

For example, if the criterion is to minimize the memory capacity, the servers 12' with 16 GB of memory will be used in this example. The fully loaded utilization 24 based on memory capacity would be (16+16)/(32+32+16+16) *100%=33%.

If the criterion is to minimize the CPU capacity, the servers 12' with RPE2 CPU benchmarks of 5000 will be used in this example. The fully loaded utilization based on CPU capacity would be (5000+5000)/(5000+5000+7000+ 7000)*100%=42%.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the analysis engine 10, or accessible or connectable thereto. Any application or module herein described may be implemented using computer readable/executable instructions that may be stored or otherwise held by such computer readable media.

Although the above has been described with reference to certain specific embodiments, various modifications thereof will be apparent to those skilled in the art without departing from the scope of the claims appended hereto.

The invention claimed is:

1. A method of analyzing computing system resources, the method comprising:
    obtaining a first set of data pertaining to characteristics of each of a plurality of computing systems;
    obtaining a second set of data pertaining to a plurality of workloads hosted on the plurality of computing systems;
    generating a first data model using the first set of data, the first data model comprising resource capacities and capabilities of the computing systems;
    generating a second data model using the second set of data, the second data model comprising requirements associated with the plurality of workloads;
    performing a workload placement analysis by iteratively placing the plurality of workloads onto different ones of the plurality of computing systems to evaluate multiple combinations, using the first and second data models and at least one analysis parameter, to determine a theoretical minimum set of computing systems required to fulfill the plurality of workloads to implement the placements, the at least one analysis parameter comprising one or more assumption, constraint or optimization criterion, wherein if not all of the plurality of workloads can be placed according to a first iteration of the workload placement analysis, at least one hypothetical computing system is determined, and at least one additional iteration of the workload placement analysis is performed using the at least one hypothetical computing system, to determine the theoretical minimum set of computing systems required;
    computing a theoretical minimum computing system capacity required by summing the capacity of the theoretical minimum set of computing systems required;
    computing a value based on a ratio of the theoretical minimum computing system capacity relative to a total capacity of the plurality of computing systems currently hosting the plurality of workloads; and
    outputting the value to indicate computing system capacity relative to workload requirements.

2. The method according to claim 1, wherein the parameters associated with the workloads comprise any one or more or resource utilization, performance requirements, availability requirements, and compatibilities.

3. The method according to claim 1, further comprising obtaining one or more assumptions, constraints, and optimization criteria indicative of how the one or more workloads are to be placed on the plurality of computing systems.

4. The method according to claim 1, further comprising obtaining one or more business policies affecting the one or more workloads.

5. The method according to claim 1, wherein the computing systems comprise one or more servers, additional servers required to host the workloads, or both.

6. The method according to claim 1, wherein the resource is of one of the following types: CPU, memory, disk I/O, network I/O, power consumption, and number of virtual processors.

7. The method according to claim 1, further comprising using the value to conduct one or more what if scenarios to add or remove one or more constraints or assumptions.

8. The method according to claim 1, further comprising repeating the method to obtain a plurality of values for multiple time periods and comparing the plurality of values.

9. The method according to claim 8, further comprising generating a visualization showing the value for a plurality of scenarios.

10. The method according to claim 1, further comprising computing a plurality of values for multiple what if scenarios over multiple time periods.

11. A non-transitory computer readable medium comprising computer executable instructions for analyzing computing system resources, the computer executable instructions comprising instructions for:
    obtaining a first set of data pertaining to characteristics of each of a plurality of computing systems;
    obtaining a second set of data pertaining to a plurality of workloads hosted on the plurality of computing systems;
    generating a first data model using the first set of data, the first data model comprising resource capacities and capabilities of the computing systems;
    generating a second data model using the second set of data, the second data model comprising requirements associated with the plurality of workloads;
    performing a workload placement analysis by iteratively placing the plurality of workloads onto different ones of the plurality of computing systems to evaluate multiple combinations, using the first and second data models and at least one analysis parameter, to determine a theoretical minimum set of computing systems required to fulfill the plurality of workloads to implement the placements, the at least one analysis parameter comprising one or more assumption, constraint or optimization criterion, wherein if not all of the plurality of workloads can be placed according to a first iteration of the workload placement analysis, at least one hypothetical computing system is determined, and at least one additional iteration of the workload placement analysis is performed using the at least one hypothetical computing system, to determine the theoretical minimum set of computing systems required;

computing a theoretical minimum computing system capacity required by summing the capacity of the theoretical minimum set of computing systems required;

computing a value based on a ratio of the theoretical minimum computing system capacity relative to a total capacity of the plurality of computing systems currently hosting the plurality of workloads; and outputting the value to indicate computing system capacity relative to workload requirements.

12. The non-transitory computer readable medium according to claim 11, wherein the parameters associated with the workloads comprise any one or more or resource utilization, performance requirements, availability requirements, and compatibilities.

13. The non-transitory computer readable medium according to claim 11, further comprising instructions for obtaining one or more assumptions, constraints, and optimization criteria indicative of how the one or more workloads are to be placed on the plurality of computing systems.

14. The non-transitory computer readable medium according to claim 11, further comprising instructions for obtaining one or more business policies affecting the one or more workloads.

15. The non-transitory computer readable medium according to claim 11, wherein the computing systems comprise one or more servers, additional servers required to host the workloads, or both.

16. The non-transitory computer readable medium according to claim 11, wherein the resource is of one of the following types: CPU, memory, disk I/O, network I/O, power consumption, and number of virtual processors.

17. The non-transitory computer readable medium according to claim 11, further comprising instructions for using the value to conduct one or more what if scenarios to add or remove one or more constraints or assumptions.

18. The non-transitory computer readable medium according to claim 11, further comprising instructions for repeating the method to obtain a plurality of values for multiple time periods and comparing the plurality of values.

19. The non-transitory computer readable medium according to claim 18, further comprising instructions for generating a visualization showing the value for a plurality of scenarios.

20. The non-transitory computer readable medium according to claim 11, further comprising instructions for computing a plurality of values for multiple what if scenarios over multiple time periods.

21. An analysis system comprising a processor and memory, the memory storing computer executable instructions for analyzing computing system resources, the computer executable instructions comprising instructions for:

obtaining a first set of data pertaining to characteristics of each of a plurality of computing systems;

obtaining a second set of data pertaining to a plurality of workloads hosted on the plurality of computing systems;

generating a first data model using the first set of data, the first data model comprising resource capacities and capabilities of the computing systems;

generating a second data model using the second set of data, the second data model comprising requirements associated with the plurality of workloads;

performing a workload placement analysis by iteratively placing the plurality of workloads onto different ones of the plurality of computing systems to evaluate multiple combinations, using the first and second data models and at least one analysis parameter, to determine a theoretical minimum set of computing systems required to fulfill the plurality of workloads to implement the placements, the at least one analysis parameter comprising one or more assumption, constraint or optimization criterion, wherein if not all of the plurality of workloads can be placed according to a first iteration of the workload placement analysis, at least one hypothetical computing system is determined, and at least one additional iteration of the workload placement analysis is performed using the at least one hypothetical computing system, to determine the theoretical minimum set of computing systems required;

computing a theoretical minimum computing system capacity required by summing the capacity of the theoretical minimum set of computing systems required;

computing a value based on a ratio of the theoretical minimum computing system capacity relative to a total capacity of the plurality of computing systems currently hosting the plurality of workloads; and outputting the value to indicate computing system capacity relative to workload requirements.

* * * * *